United States Patent [19]

Hickman

[11] 3,768,827
[45] Oct. 30, 1973

[54] SELF-STEERING STANDEM AXLE SUSPENSION

[76] Inventor: Albert F. Hickman, 8009 N. State Rd., Eden Twp., Erie County, N.Y. 14057

[22] Filed: Dec. 27, 1971

[21] Appl. No.: 212,150

[52] U.S. Cl...... 280/104.5 R, 280/124 R, 280/81 A
[51] Int. Cl. ............................................... B62d 9/00
[58] Field of Search .............. 280/104.5 R, 104.5 A, 280/104.5 B, 81 A, 124 R

[56] References Cited
UNITED STATES PATENTS
3,410,573 11/1968 Hickman...................... 280/104.5 R
3,437,347 4/1969 Hickman......................... 280/124 R
2,880,991 4/1959 Ward............................ 280/104.5 B
2,954,985 10/1960 Drong............................... 280/81 A Primary Examiner—Philip Goodman
Assistant Examiner—John A. Carroll
Attorney—Harold I. Popp

[57] ABSTRACT

In my U.S. Pat. No. 3,410,573 pairs of horizontal sliding plates 90, 92 between certain frame bearings and the frame provide tandem wheels which are self-steering to avoid tire scuff in rounding curves. Here, swinging bars between these frame bearings and the frame provide such self-steering. Such frame bearings also contribute to such swinging of these bars and all bearings are preferably rubber bushed to be friction free.

8 Claims, 8 Drawing Figures

Patented Oct. 30, 1973  3,768,827

INVENTOR.
Albert F. Hickman
BY
Harold I. Popp
ATTORNEY

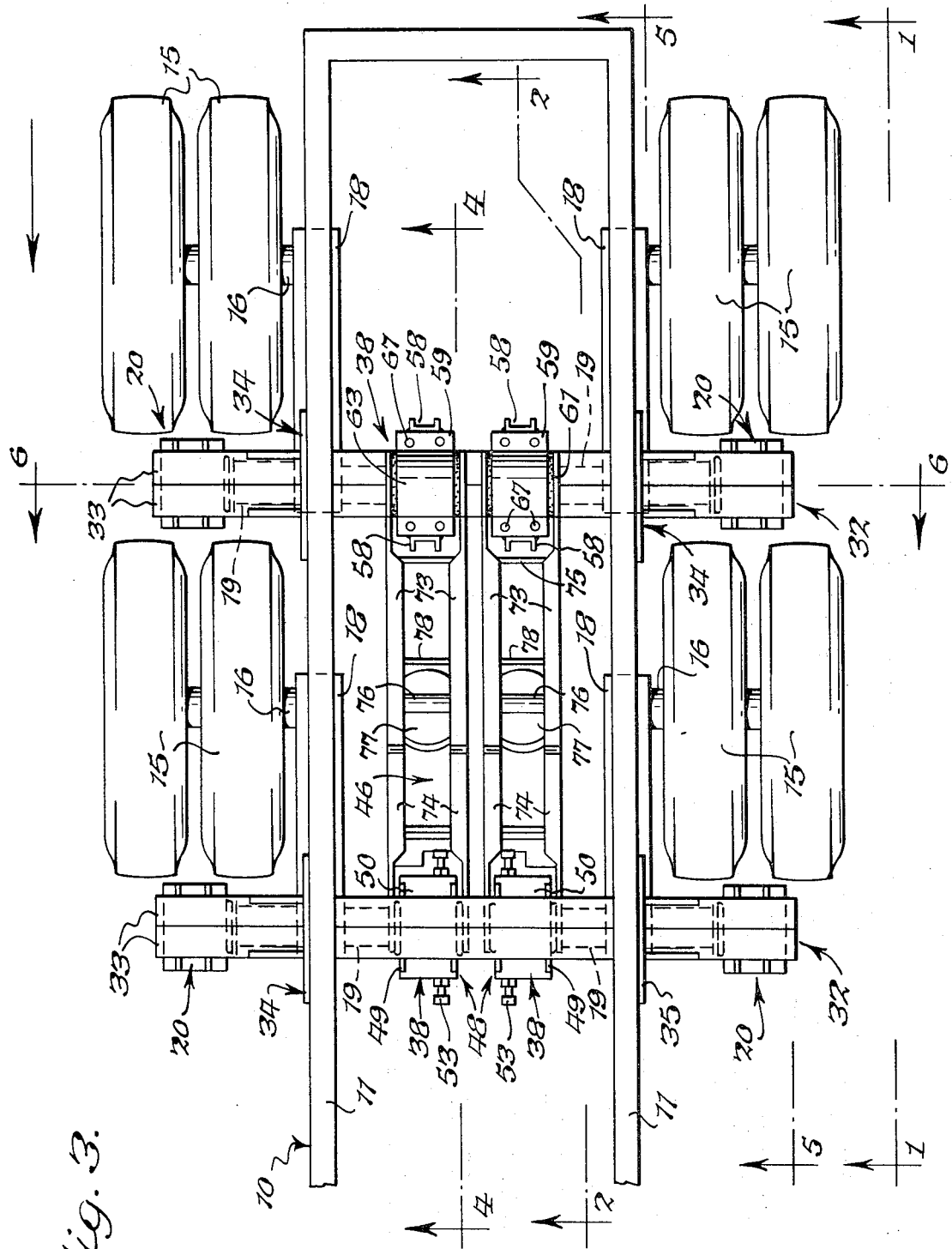

Patented Oct. 30, 1973
3,768,827
4 Sheets-Sheet 3
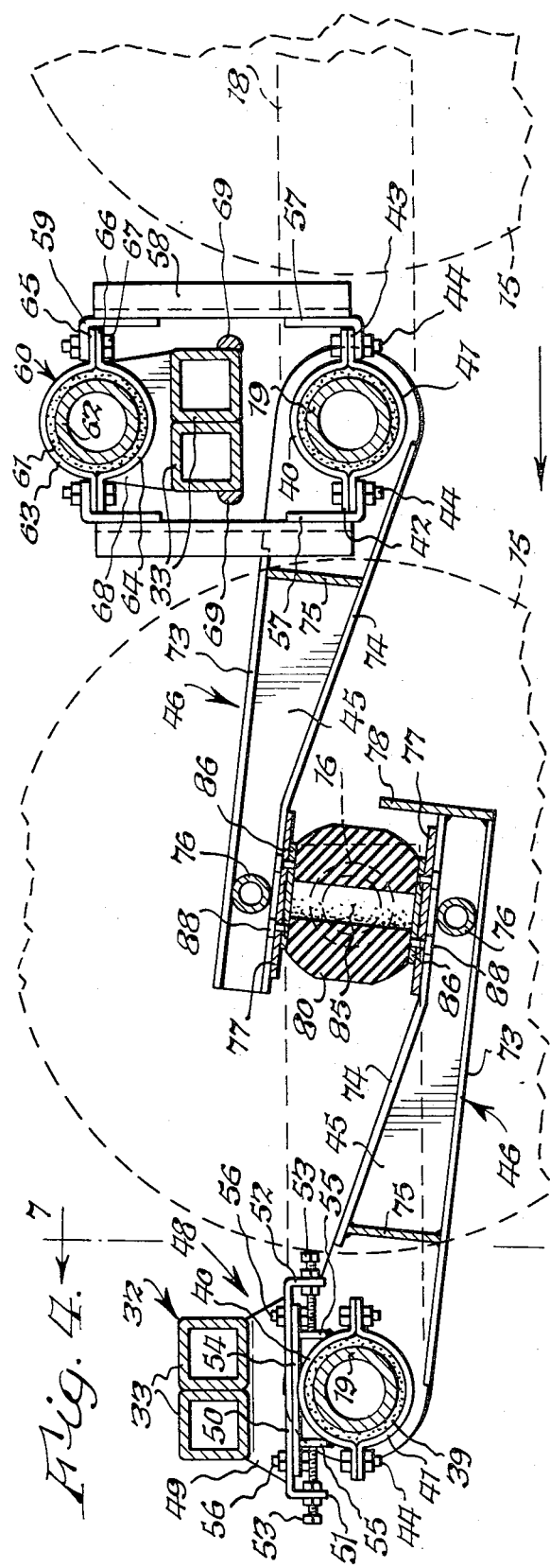
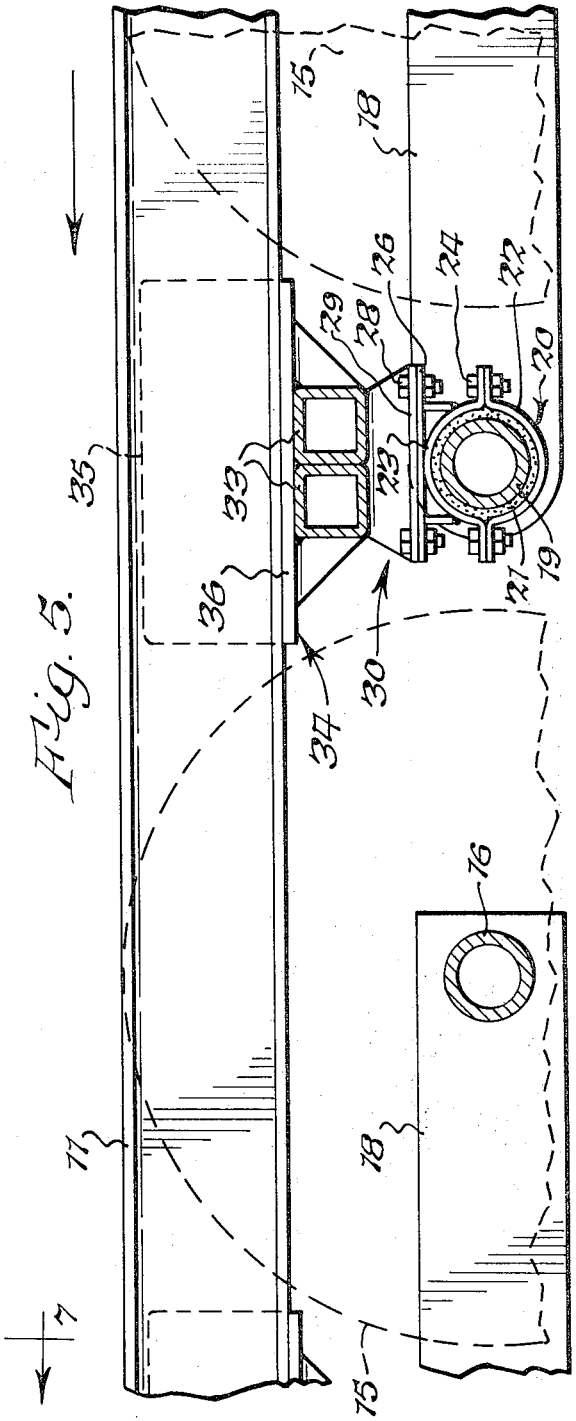
INVENTOR.
Albert F. Hickman
BY
Harold I. Popp
ATTORNEY.

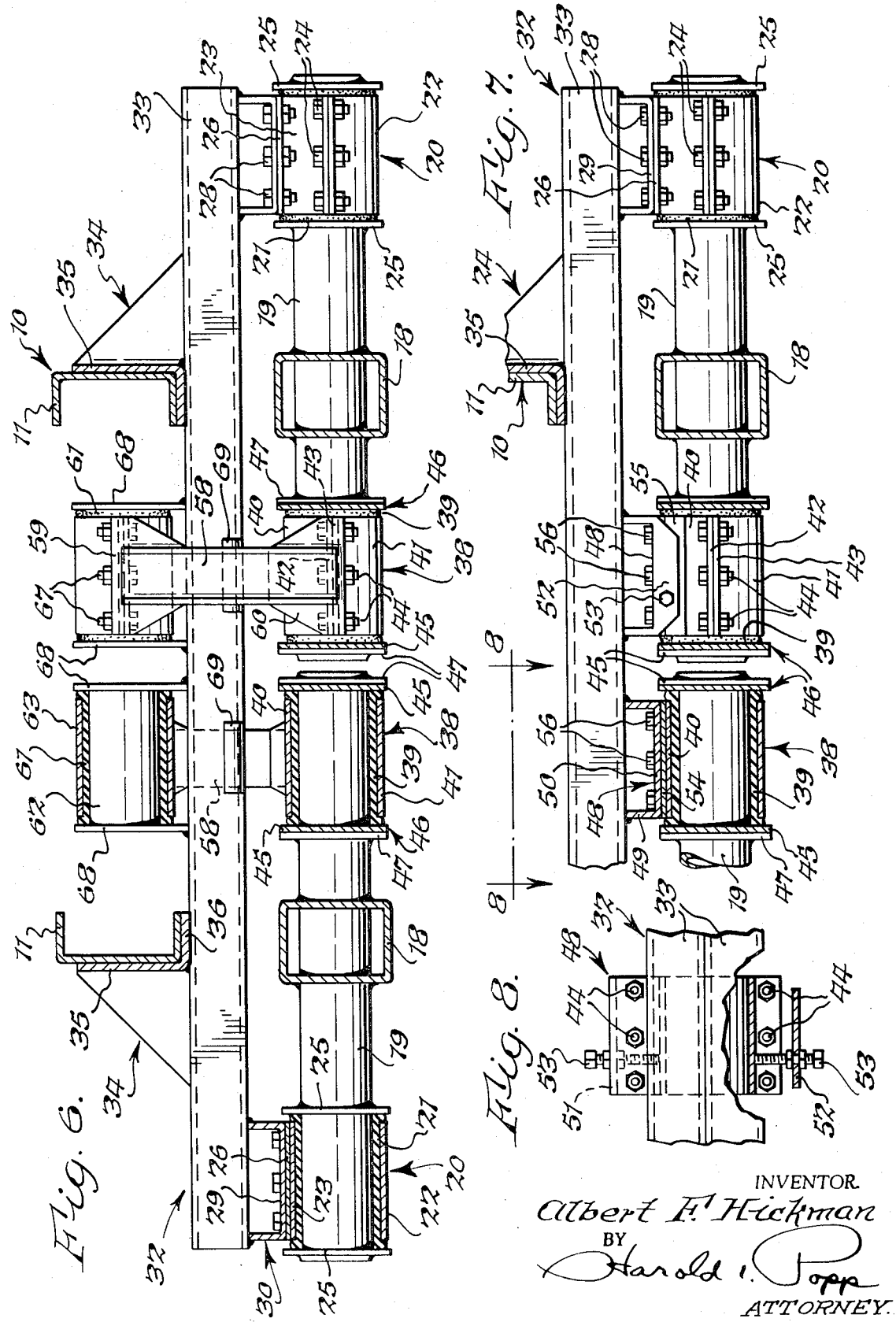

SELF-STEERING STANDEM AXLE SUSPENSION

An object of the present invention is to provide such self-steering mechanisms for tandom truck or trailer wheels which are friction and noise free, require no lubrication or servicing, and which are of low cost and sturdy construction to last the life of the vehicle without adjustment or repairs.

Another object is to provide such self-steering mechanisms which are applicable to two, three, or more tandem wheel suspensions.

Another object is to provide self-steering on relatively sharp turns without tire scuffing.

Other objects and advantages will appear from the following description and drawings in which:

FIG. 3 is a fragmentary top plan view of the rear end of the frame and the tandem wheel suspension shown in FIGS. 1 and 2.

FIGS. 4 and 5 are enlarged fragmentary vertical longitudinal sectional views taken generally on the correspondingly numbered lines, FIG. 3.

FIG. 6 is an enlarged vertical transverse section taken generally on line 6 — 6, FIGS. 3 and 4.

FIG. 7 is a fragmentary transverse section taken generally on line 7 — 7, FIG. 4, parts being shown in elevation. FIG. 8 is a fragmentary top plan view taken on line 8 — 8, FIG. 7.

Figure 1:
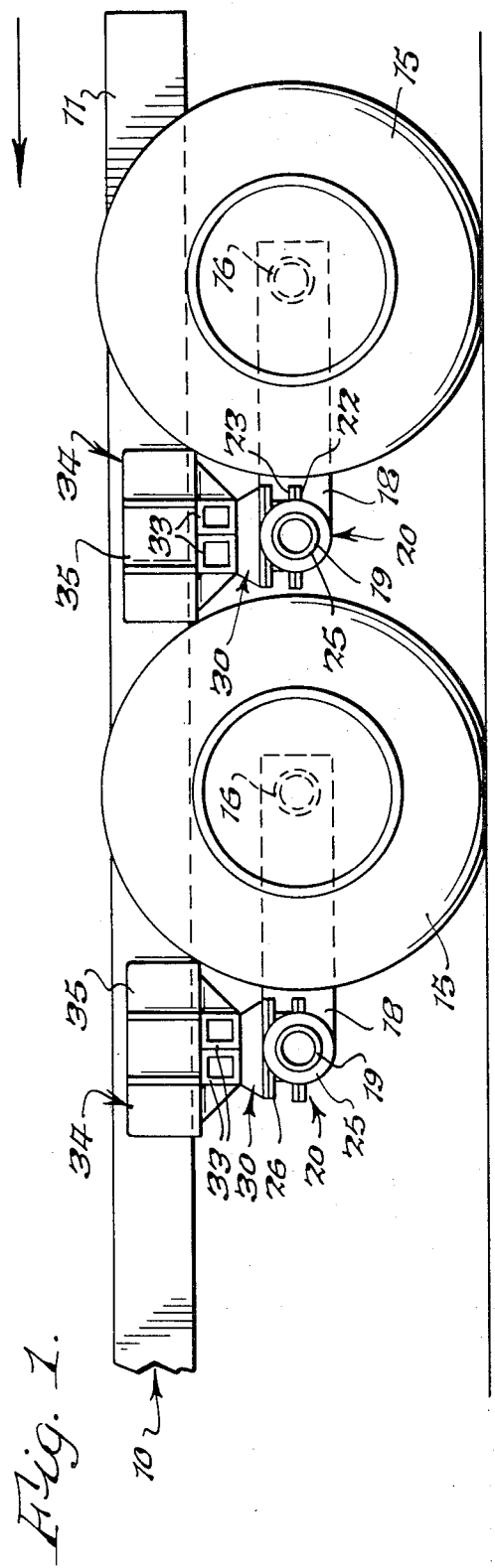
FIG. 1 is a fragmentary side elevational view of the rear end of an unloaded vehicle frame supported at each side by a tandem wheel suspension embodying the present invention, parts Being omitted for clarity, this view being taken on line 1 — 1, FIG. 3. In this and other views, the direction of vehicle travel is indicated by a large arrow.

The main frame 10 of the vehicle can be of any suitable construction and is shown as comprising a pair of main longitudinal side frame bars 11 in the form of inwardly facing straight and parallel channels connected at their rear ends by an inwardly facing cross channel bar 13.

The invention is shown as supported by wheels 15, these wheels being shown in the form of dual rubber tired wheels, that is, pairs of rim structures bolted together side-by-side and each pair of rim structures being journalled on a stub axle 16 in any suitable manner (not shown), these stub axles extending horizontally and transversely of the line of vehicle travel and the stub axles 16 at opposite sides of the vehicle being normally arranged, in pairs, axially in line with each other as best shown in FIG. 3. Each stub axle is welded or otherwise fixed to the outboard end of an arm 18, this being the rear end of the arm with reference to the line of vehicle travel. Each such arm 18 can be of any suitable form but is shown as being of rectangular tubular form in cross section with its stub axle 16 extending therethrough and being welded thereto. The inboard or forward end of each arm 18, with reference to the line of vehicle travel, is welded to a horizontal hub structure in the form of a cross shaft 19. Each hub structure or cross shaft is shown in the form of a round tubular shaft extending transversely of the line of vehicle travel and as being arranged parallel with its stub axle 16 and the axis of its wheel.

The outer end of each tubular cross shaft 19 is journalled in a bearing 20 which is preferably in the form of a rubber bushed bearing. As best shown in FIGS. 5 and 6, each of these bearings comprises a rubber bushing 21 surrounding and held in compressive relation with the outer end of its tubular cross shaft 19 by metal half bearing housings 22 and 23, these half bearing housings being drawn together to compress the rubber bushing 21 by bolts 24. The ends of the rubber bushings 21 project beyond the half bearing housings 22, 23 and abut against abutment rings 25 welded to the companion cross shaft 19 as best shown in FIGS. 6 and 7. Each top half bearing housing 22 is provided with a horizontal top plate 26 welded thereto and which is bolted as by bolts 28, to the bottom plate 29 of a U-shaped spacer block 30. The upstanding legs of each spacer block 30 are welded to the underside of a tubular cross bolster 32 formed by a pair of identical tubes 33 of rectangular form in cross section arranged side-by-side and welded to each other. Each bolster 32 extends under both main longitudinal side frame bars 11 of the vehicle frame 10 and is secured at each end to the corresponding main longitudinal side frame bar 11 by a frame bracket 34. Each frame bracket 34 comprises a vertical plate 35 secured in any suitable manner to the outside of each main longitudinal side frame bar 11 and having a horizontal flange 36 underlying this main longitudinal side frame bar 11 and overlaying the cross bolster 32, as best shown in FIGS. 5 - 7.

The inner end of each hub structure or tubular cross shaft 19 is connected to the corresponding cross bolster 32 by a bearing 38 which is also preferably a rubber bushed bearing. As best shown in FIGS. 4, 6 and 7, each bearing 38 comprises a rubber bushing 39 surrounding and held in compressive relation with the inner end of the corresponding tubular cross shaft 19 by a pair of metal half bearing housings 40, 41, these half bearing housings, each terminating in radially projecting flanges 42, 43 respectively, through which the half bearing housings are drawn into compressive relation with the rubber bushings 39 by bolts 44. The opposite ends of each rubber bushing 39 protrudes beyond its half bearing housings and abuts against the longitudinal side plates 45 of compensating levers 46 which side plates are apertured at their larger ends to fit around the inner ends of the cross shafts 19. These apertured larger ends of the side plates 45 abut against and can be welded to abutment rings 47 which are in turn welded to the cross shafts 19.

Figure 2:
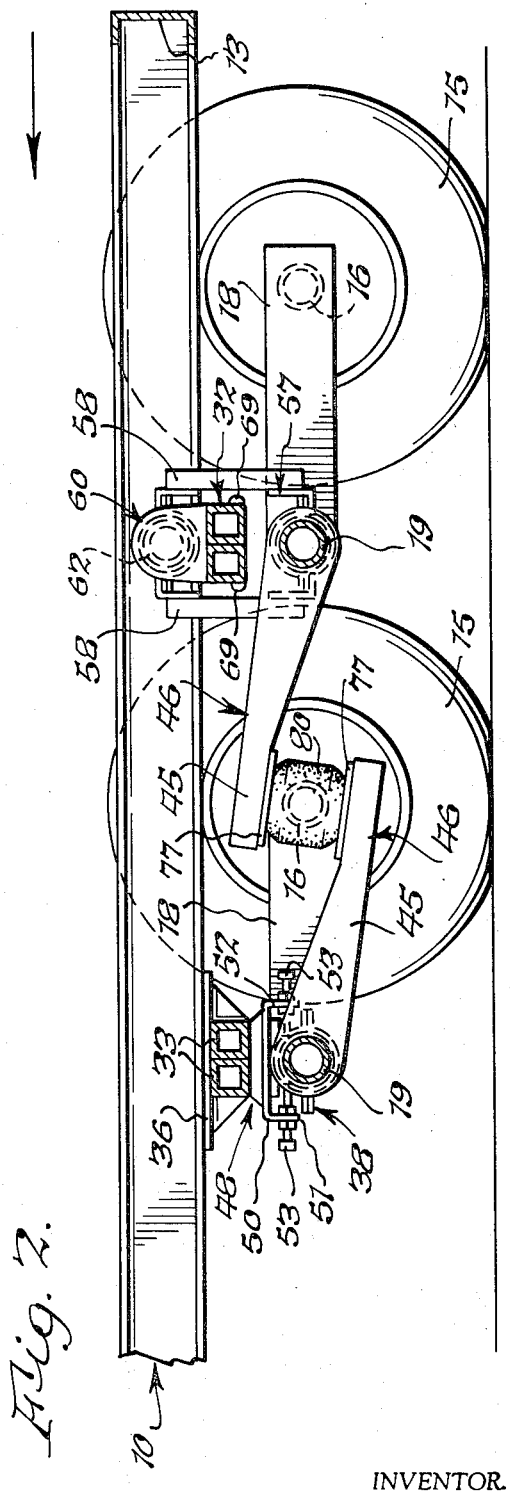
FIG. 2 is a fragmentary longitudinal section thereof taken generally on line 2 — 2, FIG. 3.

The upper half bearing housing 40 for the inner end of each front cross shaft 19 is secured to the corresponding front cross bolster as follows:

The numeral 48 represents a U-shaped metal spacer block above each forward bearing 38 and the upstanding legs 49 of which are welded to the undersides of the front cross bolster 32 as best shown in FIGS. 2, 3, 4 and 7. The horizontal bottom plate 50 of each spacer block 48 has a front depending lip 51 and a rear depending lip 52, these depending lips extending transversely of the line of vehicle travel. Each of these depending lips 51, 52 carries an adjusting screw 53 extending through a threaded hole therein, these adjusting screws extending lengthwise of the line of vehicle travel. Each screw carries a pair of lock nuts to hold it in any adjusted position. These adjusting screws 53 abut against opposite sides of a structure comprising a horizontal plate 54 (FIG. 4) and vertical side plates 55 connected, as by welding, to one another and to the top half bearing housing 40 of the companion front bearing 38. These vertical plates 55 extend lengthwise of the cross shafts 19 and the adjusting screws abut against these plates. The top plate 54 is secured by bolts 56 to the underside of the horizontal plate 50 of the companion spacer block 48. The holes for these bolts 56 are oversize to permit bolting each plate 54 to its spacer block 48 in any position of adjustment determined by the setting of the adjusting screws 53.

The present invention is embodied in the connections between the inner ends of the rear cross shafts 19 to the companion frame bolster 32 and which renders the tandem wheels 15 self-steering. Each of these connections is preferably constructed as follows:

The numeral 57 represents a pair of L-shaped brackets one leg of each of which is secured by the half bearing housing bolts 44 to the underside of a companion radially projecting flange 43 of the corresponding bottom half bearing housing 41. The other leg of each L-shaped bracket 57 is upstanding and is welded to the bottom of an upright swinging bar 58 which is shown as being channel-shaped in horizontal cross section. These channel bars 58 of each rearward bearing 38 straddle and project upwardly above the companion frame holster 32. To the upper end of each upright channel bar 58 is welded one leg of an L-shaped bracket 59, the other leg of which projects horizontally above the frame bolster 32. Each pair of these L-shaped brackets 59 is secured to this frame bolster 32 by a rubber bushed bearing 60 which is preferably constructed as follows:

The numeral 61 represents a flexible rubber sleeve surrounding and held in compressive relation with a metal cylinder 62. The rubber sleeve 61 is compressed by a pair of surrounding half bearing housings 63, 64 having mating radially outwardly projecting end ears or flanges 65, 66, respectively. The bolts 67 which draw each pair of these flanges together also secure the top horizontal flanges of the angle brackets 59 to the top faces of the flanges 65.

The metal cylinder 62 of each bearing 60 is arranged above its frame bolster 32 and directly above its companion rearward bearing 38. It is fixed to this frame bolster 32 by metal end brackets 68 to which it is welded and which are in turn welded to the rearward bolster 32. The axis of each of these frame bearings 60 is above and parallel with the axis of the companion rearward bearing 38. This permits limited swinging movement of these bearings 38 (for the inner ends of the rear cross shafts 19) fore-and-aft of the line of travel of the vehicle. This limited movement is preferably insured by metal stop bars welded to the fore and aft sides of the rear frame bolster 32 in the path of the upright swinging channel bars 58 which connect these bearings 60 and 38.

The compensating levers 46 have been referred to as each having a pair of vertical side plates 45 apertured to embrace and being welded to the inner end of its hub structure or cross shaft 19. Each of these compensating levers is completed by flanges 73, 74 projecting toward one another from the longitudinal edges of each side plate 45, a generally upright cross plate 75 connecting the fulcrum ends of the side plates 45, and cross rods 76 and generally horizontal plates 77 connecting those ends of each pair of side plates 45 which are remote from their cross shaft 19. With reference to the line of vehicle travel, the forward compensating lever 46 trails and has its rear end arranged below the forward end of its companion compensating lever 46 for the corresponding rear wheel 15. Also the rear extremity of each of these forward compensating levers 44 has a welded upright plate 78 the upwardly projecting edge 79 of which can engage the underside of its rearward compensating lever 44 in event of breakdown of its compression rubber spring body 80, hereinafter described.

In the tandem wheel suspension shown, with reference to the line of vehicle travel, all of the wheel arms 18 trail or project rearwardly from their hub structures or cross shafts 19; each forward compensating lever 46 also trails or projects rearwardly from its front hub structure or cross shaft 19; but the rearward compensating lever 46 projects forwardly from its rear hub structure or cross shaft 19 to a position above the rear end of the companion forward compensating lever 46. By this arrangement a simple compression rubber spring body 80 can be interposed between the opposing superposed ends of each pair of compensating levers 46 to provide resilient support for the vehicle frame 10 on its tandem wheels 15.

This flexible rubber body 80 is shown as being of generally cylindrical or barrel-like form with tapered ends of diminishing cross section, and a through bore 85 extending therethrough. A circular end plate 86 can be secured, as by vulcanization, to each tapered end of the rubber body and each of these circular end plates 86 can be secured, as by screws 88, to the corresponding cross plates 78 of the pair of compensating levers levers 44 between which each compression rubber body 80 is interposed.

OPERATION

The direction of movement of the vehicle is shown by large arrows above FIGS. 1 – 3 and 5 and below FIG. 4 and in operation, the upward movement of either front tandem wheel 15 and its stub axle 16 effects a corresponding upward movement of its wheel arm 18 and counterclockwise movement (as viewed in FIGS. 1, 2, 4 and 5) of the hub structure or tubular cross shaft forming the hub of this wheel arm 18, such movement being permitted by the rubber bushings 21 and 39 of the frame bearings 20 and 38 for this front wheel hub structure 19. This angular counterclockwise movement of the hub structure or tubular cross shaft of the front tandem wheel 15 is transmitted directly to the companion compensating lever 46 fixed to project rearwardly from this front cross shaft 19 so as to cause an upward movement of the rear end of this front tandem wheel compensating lever 46.

Conversely, the upward movement of either rear tandem wheel 15 and its stub axle 16 effects a corresponding counterclockwise movement (as viewed in FIGS. 1, 2, 4 and 5) of the hub structure or tubular cross shaft 19 forming the hub of this wheel arm 18, such movement being permitted by the rubber bushings 21 and 39 of the frame bearings 20 and 38 for this rear tandem wheel hub structure 19. This angular counterclockwise movement of the tubular cross shaft 19 for this rear tandem wheel 15 is transmitted directly to the corresponding compensating lever 46 fixed to project forwardly from this cross shaft so as to cause a downward movement of the front end of this rear tandem wheel compensating lever 46.

The rear end of the front tandem wheel compensating lever 46 and the front end of the rear tandem wheel compensating lever 46 are arranged one above the other and also move toward each other in response to such upward movement of either tandem wheel (or downward movement of the body 10 under increasing load thereon). It is also desirable that each front tandem wheel compensating lever 46 be arranged below and be moved upwardly by the upward movement of its front tandem wheel 15.

Thus, with such movement of the superposed ends of the compensating levers 46 toward each other (the bottom one up and the top one down), a simple compression rubber spring body 80 can be interposed between each pair of these superposed ends to provide resilient support for the frame 10 on the wheels 15. This rubber body 80 can be of the generally cylindrical hollow core barrel shape shown and expands and contracts transversely of its hollow core to accomodate changes in load as well as in road conditions.

By having the rear end of the front tandem wheel compensating lever 46 move upwardly in its working movement and the front superposed end of the rear wheel compensating lever 46 move downwardly in its working movement, it will be observed that not only will the suspension merely become springless in the event of complete breakdown or loss of the rubber spring 80, but also the compensating levers 46 will not drag along the road, much less dig into the road, in the event of such complete spring failure.

The suspension is self-steering, that is, in rounding a curve the stub axles 16 of the rear tandem wheels 15 will assume such angles in a horizontal plane with reference to the fixed stub axles 16 of the front tandem wheels 15 as will enable all of the wheels to round the curve without tire scuffing. This self-steering is effected by the rubber bushed frame bearings 60 and the hangers or channel-shaped swinging bars 58 which are supported by the bearings 38 at the inner ends of the rear cross shafts or hub structures 19. These rubber bushed frame bearings and swinging bars or hangers 58 permit limited fore-and-aft movement of the inner ends of the rear cross shafts 19. Thus, referring to FIG. 3, in rounding a curve, say, to the right, the rear pair of tandem wheels 15 will be drawn to the right (with reference to the frame 10), by the swinging of the rear end of the frame 10 to the left, through their frictional engagement with the roadway, in order to avoid tire scuffing in rounding the curve. If this force against the tires were resisted, tire scuffing would take place, but such movement to the right of the rear tandem wheels 15 is permitted, the rear tandem wheel stub shafts 16, cross shafts 19 and bearings 38 swinging counterclockwise, as viewed in FIG. 3, about vertical axes intersecting the frame bearings 20 to permit the rear tandem wheels 15 to track properly around the curve without tire scuff. This movement is permitted by the fore-and-aft swinging of the hanger bars 58 which suspend each bearing 38 at the inner end of each rearward cross tube 19 from a rubber bushed frame bearing 60. These hanger bars 58 permit the required forward movement of the inner end of the left hand rear cross shaft 19 and the required rearward movement of the inner end of the right hand rear cross shaft 19 for this purpose. On returning to a straightaway, the rear pair of rubber tired tandem wheels, again to avoid tire scuff, return to their normal relation shown.

By "rubber" as used in the accompanying claims is meant natural rubber, synthetic rubber or a mixture thereof, and by "wheel" is meant the ground engaging means 15 whether in the form of a single wheel or the dual wheels shown.

I claim:

1. A vehicle spring suspension adapted to support the rear end of a vehicle frame on a pair of front rubber tired wheels arranged at the opposite sides of said frame and also on a pair of rear rubber tired wheels arranged at opposite sides of said frame directly in rear of and in tandem relation to said front pair of wheels, and the suspension having a generally horizontal hub structure associated with each wheel extending axially transversely of the line of vehicle travel, an arm fixed at one end to each hub structure and projecting radially therefrom, a stub axle connected at one end to each arm remote from its hub structure and forming a journal for the corresponding wheel, a compensating lever fixed at one end to each hub structure and projecting radially therefrom with the other end of one of said compensating levers being arranged above the other end of the other of said compensating levers, spring means interposed between said other ends of said compensating levers to provide resilient support for said frame on said tandem wheels, and means pivotally connecting the hub structures of one such pair of wheels to said frame on an axis extending transversely of said line of vehicle travel; wherein the improvement reduces scuffing of the tires of said wheels and comprises a first bearing means supporting said frame on one end of each hub structure of said other pair of wheels and permitting movement of said one end of each hub structure about a generally vertical axis to permit generally horizontal movement of the other end of each hub structure of said other pair of wheels lengthwise of said line of vehicle travel, a second bearing means supported by said other of each hub structure of said other pair of wheels, a third bearing means attached to said frame in vertically spaced, generally axially parallel relation to each second bearing means, and an upright swinging member journalled at one end on each second bearing means and at its other end on each third bearing means and permitting such movement of each of said other pair of wheels about its said vertical axis to reduce tire scuffing on steering the vehicle to the right or left.

2. A vehicle spring suspension as set forth in claim 1 wherein said one pair of wheels is the front pair and said other pair of wheels is the rear pair.

3. A vehicle spring suspension as set forth in claim 1 wherein said one end of each hub structure of said other pair of wheels is its outboard end, and said other end of each hub structure of said other pair of wheels is its inboard end.

4. A vehicle spring suspension as set forth in claim 1 wherein each said third bearing means is above its companion second bearing means.

5. A vehicle spring suspension as set forth in claim 4 wherein two such upright swinging members are so journalled at one end on each second bearing means and at their other ends on each companion third bearing means, one such upright swinging member being arranged in advance of the other with reference to the line of vehicle travel, and wherein the suspension additionally includes a frame cross bolster fixed to such pair of third bearing means and such pair of first bearing means and supports the frame thereon.

6. A vehicle spring suspension adapted to support the rear end of a vehicle frame on a pair of front rubber tired wheels arranged at the opposite sides of said frame and also on a pair of rear rubber tired wheels arranged at opposite sides of said frame directly in rear of and in tandem relation to said front pair of wheels, and the suspension having a generally horizontal hub structure associated with each wheel extending axially transversely of the line of vehicle travel, an arm fixed at one end to each hub structure and projecting radially therefrom, a stub axle connected at one end to each arm remote from its hub structure and forming a journal for the corresponding wheel, a compensating lever fixed at one end to each hub structure and projecting radially therefrom with the other end of one of said compensating levers being arranged above the other end of the other of said compensating levers, spring means interposed between said other ends of said compensating levers to provide resilient support for said frame on said tandem wheels, and means pivotally connecting the hub structures of one such pair of wheels to said frame on an axis extending transversely of said line of vehicle travel; wherein the improvement reduces scuffing of the tires of said wheels and comprises a first bearing means supporting said frame on one end of each hub structure of said other pair of wheels and permitting movement of said one end of each hub structure about a generally vertical axis to permit generally horizontal movement of the other end of each hub structure of said other pair of wheels lengthwise of said line of vehicle travel, a second bearing means supported by said other end of each hub structure of said other pair of wheels and including a metal housing, a third bearing means including a metal housing attached to said frame in vertically spaced, generally axially parallel relation to each second bearing means, and an upright swinging member secured at one end to the metal housing of each second bearing means and at its other end to the metal housing of each third bearing means and permitting movement of each of said other pair of wheels about said vertical axis to reduce tire scuffing on steering the vehicle to the right or left.

7. A vehicle spring suspension as set forth in claim 6 wherein said second and third bearing means each includes a flexible rubber sleeve under compression within their metal housings and providing their bearing action.

8. A vehicle spring suspension as set forth in claim 6 wherein two such swinging bars connect the metal housings of each companion second and third bearing means, one such swinging bar being arranged in advance of a companion swinging bar with reference to the line of vehicle travel.

* * * * *